(No Model.)
G. S. FINNEY.
DISH CLEANER.
No. 555,570. Patented Mar. 3, 1896.
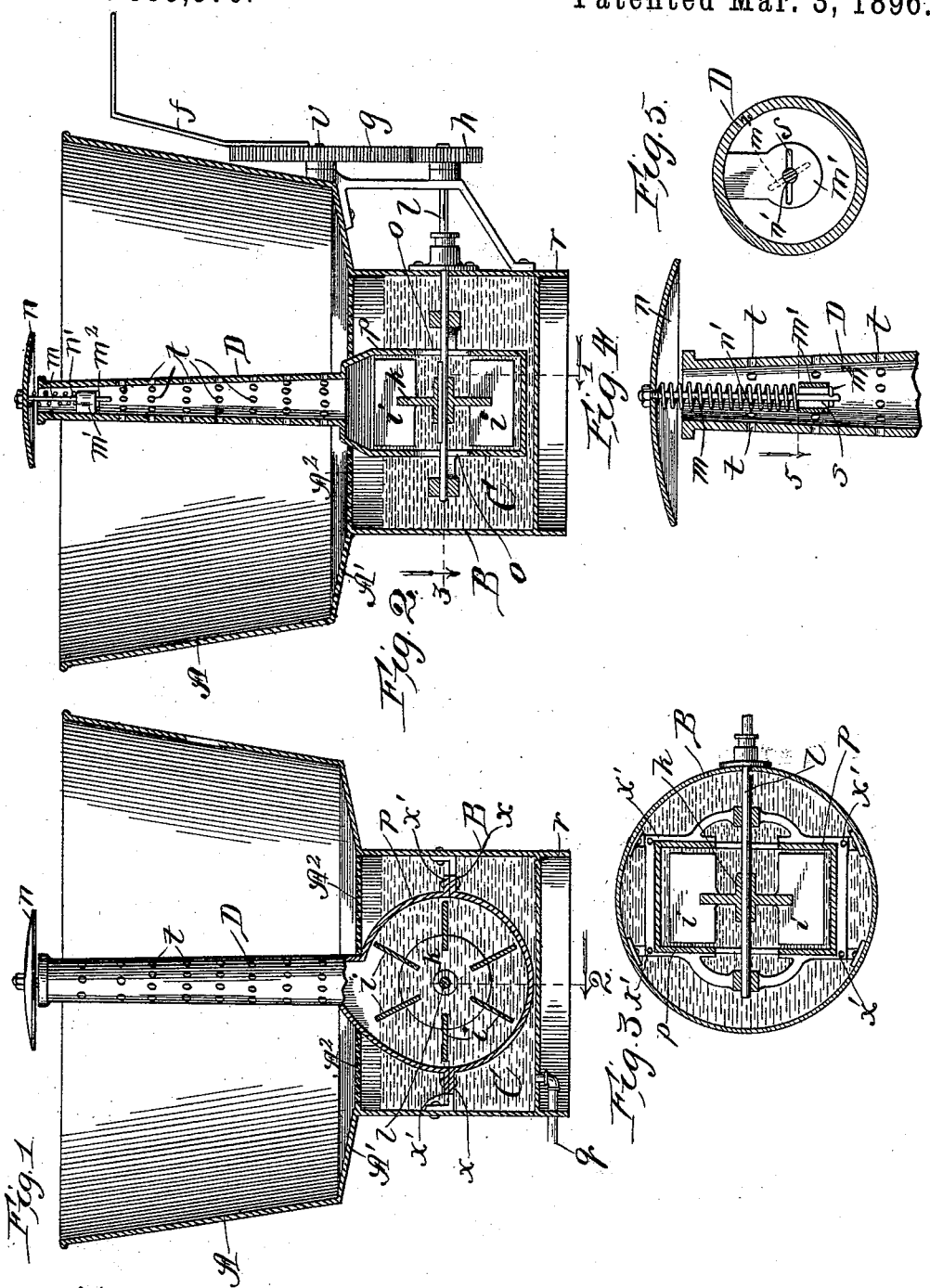
Witnesses:
Inventor:
George S. Finney,
By Dyrenforth & Dyrenforth,
Attys

UNITED STATES PATENT OFFICE.

GEORGE S. FINNEY, OF CHICAGO, ILLINOIS.

DISH-CLEANER.

SPECIFICATION forming part of Letters Patent No. 555,570, dated March 3, 1896.

Application filed June 8, 1895. Serial No. 552,103. (No model.)

*To all whom it may concern:*

Be it known that I, GEORGE S. FINNEY, a citizen of the United States, residing at Chicago, in the county of Cook and State of Illinois, have invented a new and useful Improvement in Dish-Washing Machines, of which the following is a specification.

The object of my invention is to provide a portable dish-washing machine of simple and durable construction and which shall be highly effective in its purpose. To this end I provide the holder for the dishes to be washed with a water-receptacle below it containing means for forcing the water upward through a perforated stand-pipe extending vertically through the dish-holding receptacle and through which the water is sprayed upon the dishes.

My invention consists in the general as well as the more specific construction of my improvement.

Referring to the accompanying drawings, Figure 1 shows my improved dish-washing machine by a view in sectional elevation. Fig. 2 is a similar view of the same, taken at a right angle to that presented by Fig. 1; Fig. 3, a section taken at the line 3 on Fig. 2 and viewed in the direction of the arrow; Fig. 4, an enlarged broken view of the upper portion of the stand-pipe, showing a detail of construction; and Fig. 5 a section taken at the line 5 on Fig. 4 and viewed in the direction of the arrow.

A is the receptacle for the dishes to be washed, formed preferably of sheet metal and of the upwardly-flaring form illustrated, with a bottom A' inclined inwardly and downwardly throughout part of its extent, the central portion of the bottom being flat and perforated, as shown at $A^2$. Below the receptacle A and preferably formed integral therewith is a narrower receptacle B for water, having a circumferential base-flange $r$ and a discharge-pipe $q$, which should be normally closed, leading from its base. In the receptacle B is housed and supported a centrifugal pump C. This pump comprises a shell $p$, which may be formed in sections, as illustrated, bolted together at their flanges $x$ $x'$ and fastened at the flanges $x$ to the sides of the receptacle B. The shell has side openings $o$, and an outlet in its upper side opening into a stand-pipe D, extending vertically through the receptacle A, preferably at its center, the stand-pipe being provided with numerous perforations $t$ and at its upper end with a distributer $n$ on a stem $m$ suitably fastened in the stand-pipe. A rotary shaft $l$ is journaled in bearings, as shown, to extend through the shell $p$ at its openings $o$ and carries within the shell a hub $k$, provided with radially-extending arms or paddles $i$. At its outer end the shaft carries a pinion $h$, meshing with the cog-wheel $g$, journaled at $v$ and provided with a crank-handle $f$.

As the preferred means for fastening the distributer $n$ at its stem, I provide a lug $m'$, rigidly supported in the upper portion of the stand-pipe and containing a vertical slot $s$ to admit the stem and a transverse pin $m^2$ near its lower end, whereby, on inserting the stem and pin through the lug and turning it, it may not be withdrawn; and to sustain the distributer in its operative position I surround the stem by a spring $n'$ confined between the distributer and lug.

To operate my improved machine it may be placed in any suitable position—as, for example, on the kitchen-stove—and hot water is introduced into the receptacle B in sufficient quantity to extend above the plane of the openings $o$. The dishes to be washed are piled into the receptacle A, and upon then turning the crank $f$, to rotate the shaft $l$, the paddles by their centrifugal action upon the water force it upward in the stand-pipe, whence it streams out through the perforations $t$ against the dishes, and the surplus water, which discharges through the upper end of the stand-pipe, is spread by the distributer $n$ and descends upon the dishes. All the water that thus enters the receptacle A, together with the refuse it washes from the dishes, returns to the receptacle B through the perforated bottom $A^2$ and may be used over and over again. Preparatory to supplying fresh water for the dish-washing operation the dish-water may be withdrawn through the pipe $q$.

Practical use of my improved machine shows it to be thorough and expeditious in its dish-washing operation.

There is an object in the particular construction of the distributer $n$, inasmuch as it is thereby rendered conveniently removable to permit a kettle or the like to be placed in inverted position over the top of the stand-pipe and be washed by the water which escapes through the upper end thereof.

The fit of the base of a kettle against the upper end of the stand-pipe is not so close but what the water can escape from such end with sufficient freedom for my purpose of utilizing it to wash the kettle.

What I claim as new, and desire to secure by Letters Patent, is—

1. A dish-washing machine, comprising an upper receptacle for the dishes to be washed, a lower water-receptacle, a centrifugal-pump apparatus in the lower receptacle provided with means for actuating it, and a perforated stand-pipe in the upper receptacle forming the discharge-outlet from said pump, substantially as described.

2. A dish-washing machine comprising an upper receptacle for the dishes to be washed, a lower water-receptacle, a water-forcing apparatus in the lower receptacle provided with means for actuating it, a perforated stand-pipe in the upper receptacle containing a slotted lug $m'$, and a distributer $n$ provided with a stem $m$ carrying a pin $m^2$ and yieldingly supported on said lug by a spring $n'$ confined between it and the distributer, substantially as described.

3. A dish-washing machine comprising an upper receptacle for the dishes to be washed provided with a perforated bottom, a lower water-receptacle, a pumping apparatus C in the lower receptacle comprising a shell $p$ and a rotary shaft therein carrying paddles $i$ and provided with means for rotating it, and a perforated stand-pipe D into which said pumping apparatus discharges and extending upward through said upper receptacle, substantially as described.

4. A dish-washing machine comprising, in combination, the upper receptacle A provided with an inclined perforated bottom $A'$ $A^2$, the lower water-receptacle B, a pumping apparatus C in the lower receptacle comprising a shell $p$ provided with openings $o$ and a discharge-outlet in its upper end, a rotary shaft $l$ extending through said openings and carrying radial paddles $i$, means for rotating the shaft and a stand-pipe D extending from the discharge-outlet of said shell upward through the receptacle A and provided with perforations $l$ in its sides and with a distributer at its upper end, the whole being constructed and arranged to operate substantially as described.

GEORGE S. FINNEY.

In presence of—
M. J. FROST,
J. N. HANSON.